Jan. 21, 1930.   W. W. ROBINSON   1,744,505
ELECTRIC STEAM HEATING APPARATUS
Filed May 12, 1927
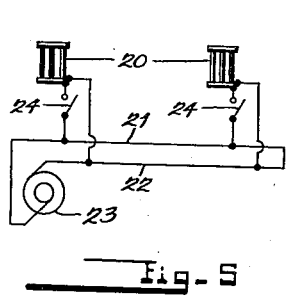
Fig-5
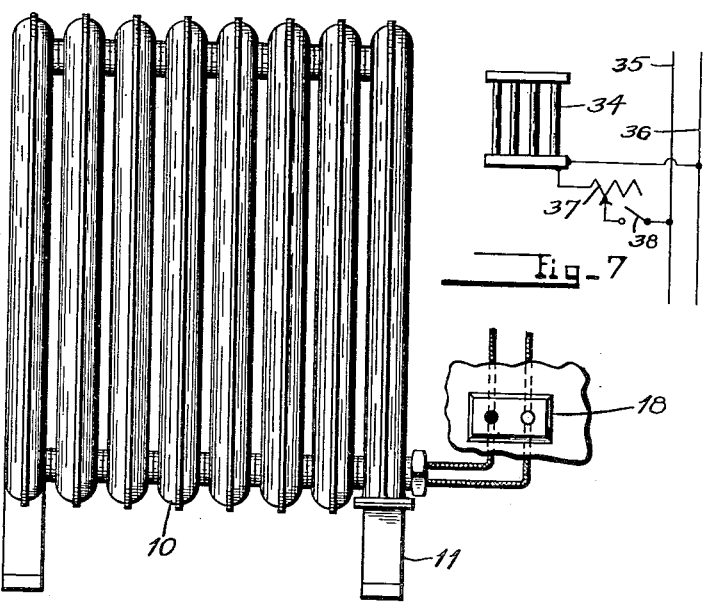
Fig-7
Fig-1
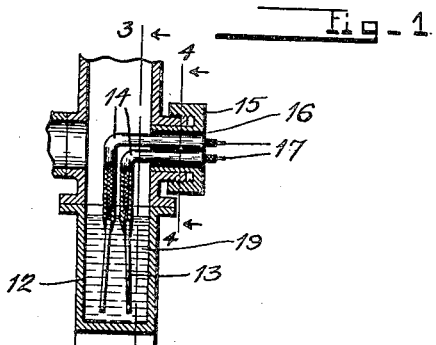
Fig-2
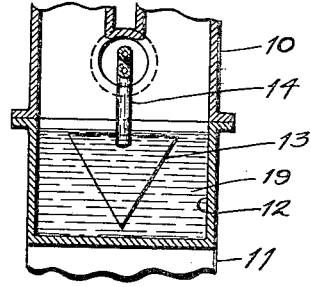
Fig-3
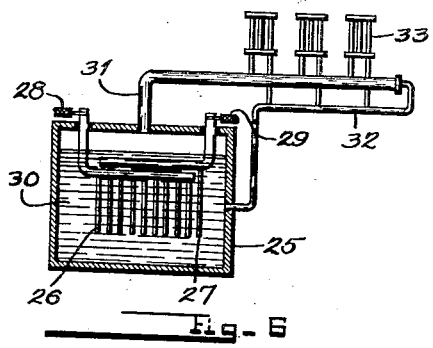
Fig-6
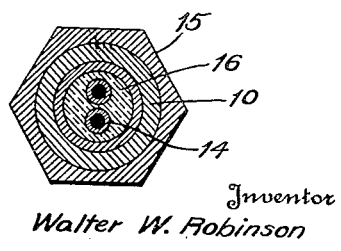
Fig-4
Inventor
Walter W. Robinson
By
John W Darley
Attorney Patented Jan. 21, 1930

1,744,505

UNITED STATES PATENT OFFICE

WALTER W. ROBINSON, OF ANNISTON, ALABAMA

ELECTRIC STEAM-HEATING APPARATUS

Application filed May 12, 1927. Serial No. 190,812.

My invention relates to electric steam heating apparatus.

The principal object of my invention is to devise a heating apparatus which is so constructed as to secure and maintain a constant temperature in the space where located, and to achieve this result with an arrangement which is free from moving parts and simple in design.

A further object is to devise a heating apparatus of the character described, using water as a working fluid for the production of steam through the medium of an electric current, in which the rate of generation of the steam, and therefore the available heat, is automatically controlled by temperature conditions external of the apparatus.

A further object is to devise an apparatus as above set forth, particularly of the so-called radiator construction, which avoids the necessity for extensive pipe installations and which may be manufactured in convenient portable units for operation in locations to which electric energy is accessible.

Steam heating plants as now known in the art, whether fired by coal or fluid fuels, comprise a boiler and a system of radiators connected through an extensive pipe layout. This arrangement is not only expensive to install but possesses several regulatory disadvantages relative to the control of the heat produced. This regulation is achieved either through the manual operation of valves that control the flow of steam to the radiating members, or automatically by means of a thermostat which is controlled by the temperature of the room adjacent thereto. The valve method of operation permits an individual control of each radiator, but is obviously awkward, requires constant attention, and clearly lacks that precision which is essential to the maintenance of a constant temperature. On the other hand, the thermostat system of control avoids the necessity for manual functioning of the separate valves, but is characterized by inflexibility in operation, owing to the fact that the governing is performed at the boiler, rather than at the individual radiators whose heat demands may differ.

My improved apparatus obviates the objections noted above as will be pointed out more particularly hereinafter. Essentially, it comprises a radiating member with which is operatively associated an electrolytic cell, either in a unitary structure or as connected elements. The cell contains a suitable electrolyte of an amount and character dependent upon the operating conditions, but possessing a high resistance to the flow of an electric current, and two or more electrodes are submerged therein, the whole unit being then sealed. If an electromotive force is impressed on the terminals of the electrodes, preferably alternating in nature, the current established will be a function of the usual factors inherent in electrolytic conduction, respecting the voltage, distance between and number of electrodes, character of the electrolyte, etc., but in addition on the extent of coverage of the electrodes by the electrolyte.

None of the above factors are subject to change in any given installation, except the coverage feature. The passage of current through the high resistance electrolyte requires energy which appears in the form of heat, causing a vaporization of the electrolyte which flows into the coils of the radiator as steam. This emission of steam will lower the level of the electrolyte and hence will cause a decrease in the value of the current flowing, but contact of the steam with the walls of the radiator results in the formation of condensate which returns to the cell to resume the cycle. The rate of condensation, or return flow of the electrolyte to the cell, which is obviously dependent upon the temperature external to the radiator, will determine the level of the electrolyte, which in turn controls the value of the current flowing and the generation of steam. Hence, the external temperature governs the current flow and the heat generated will vary inversely with fluctuations in this temperature. It will be apparent, therefore, that the apparatus is entirely automatic in operation and affords an effective means of maintaining a constant room temperature.

These and further objects of my invention will be set forth in the following specification, reference being had to the accompanying drawing, and the novel means by which said objects are effectuated will be definitely set forth in the claim.

In the drawing:

Fig. 1 is an elevation of a radiator embodying my improved arrangement.

Fig. 2 is an enlarged view of a portion of the radiator shown in Fig. 1, showing the electrolytic cell.

Figs. 3 and 4 are sections along the lines 3—3 and 4—4, respectively, in Fig. 2, looking in the direction of the arrows.

Fig. 5 is a diagrammatic view of the electrical connections used in a system of radiators.

Fig. 6 is a diagrammatic representation of a furnace structure arranged in the manner of my apparatus and serving as a source of steam for a radiator system.

Fig. 7 is a diagrammatic representation of a modified method of connecting my improved apparatus to a source of electrical energy.

In the drawing:

The numeral 10 represents a radiator of conventional type having any desired number of heating coils. One of the legs 11 of said radiator is removably secured to the main body portion thereof and comprises a pocket 12 of a suitable capacity. One or more pairs of electrodes 13 are disposed within said pocket at one end of supports 14, the other end of said supports extending through a hole formed in one of the coils of the radiator 10, said hole being closed by a plug 15. An insulating sleeve 16 is mounted in said plug and serves to insulate the supports 14 therefrom. The electrodes 13 are connected to a source of electrical energy, preferably alternating in nature for a purpose hereinafter explained, by means of electrical connections 17 which extend through the supports 14 and are joined to a switch 18 which may be used to establish a current flow to said electrodes. The pocket 12 is filled with an electrolyte 19 to a depth sufficient to fully cover the electrodes 13. Said electrolyte may be of any desired character, but preferably exerts a high resistance to the passage of an electric current. The so-called hydrant water has been found to be very satisfactory for this purpose.

From the foregoing, it will be apparent that the pocket 12 and allied parts embody the essential characteristics of an electrolytic cell. The manner of arranging this cell as shown is intended to be merely representative of the general conception involved, as it will be readily understood that the cell may comprise a separate unit from the radiator, but connected therewith.

Assuming that water of the character noted above forms the electrolyte, when an alternating potential is applied to the terminals of the electrodes 13, a current will be established in the electrolyte 19 between said electrodes. The strength of this current will depend upon the value of the impressed electromotive force, distance between and number of the electrodes, character of the electrolyte, and the per cent coverage of the electrodes. Of these factors, only the latter undergoes a variation during the conditions of operation and hence this feature alone need be considered.

The resistance offered by the electrolyte 19 to the passage of the current generates heat which operates to raise the temperature of the water, the latter eventually reaching the boiling point and feeding steam into the coils of the radiator. It will be understood that the frequent polarity reversals of the electrodes 13, occasioned by the alternating electromotive force, will prevent the separate formation of hydrogen and oxygen which would unduly raise the pressure in the system, the latter being closed as shown in Fig. 1. Hence, the current flow is manifested only in heat effects which cause the formation of steam. This generation of steam will effect a lowering of the electrolyte 19 and therefore a decrease in the value of the current flowing, since the resistance is increased. However, the electrolyte level will not continue to lower, since the condensation of steam, depending upon the temperature external of the radiator, will return liquid to the pocket 12.

In view of the above, it will be obvious that, if the external temperature be initially low, then when said radiator is first placed in operation, the return of condensate will be relatively rapid, thus serving to maintain the level of the electrolyte 19 and the value of the current at a relatively high point. Accordingly, steam will be formed rapidly. As the radiator continues to emit heat, the temperature of the space adjacent thereto will rise and the rate of condensation within the radiator will fall; hence, the electrolyte level will fall, causing a lowering of the current value and a reduction in the generation of steam. Eventually, a point of equilibrium will be reached when the heat emitted by the radiator will be sufficient to maintain the temperature of the surrounding space at some predetermined figure, or in other words, an electrolyte level and a current value will be reached which will be just sufficient to generate steam that is adequate for this purpose.

Radiators are selected on a basis of square feet of heating surface in relation to the space which they are intended to serve. Accordingly, it is contemplated that each radiator will contain a predetermined amount of electrolyte, dependent upon the same factors, but in conjunction with the obtainment of some predetermined constant temperature. As an aid in the securing of this result, it has been ascertained that triangular shaped electrodes afford good results, preferably arranged with the apexes lowermost and disposed further apart than the corresponding opposite sides, as shown clearly in Figs. 2 and 3. These latter features serve to improve the regulatory characteristics of the device relative to variations in the electrolyte level.

Accordingly, it will be apparent that my improved apparatus not only embodies a distinct advantage over present systems in that a constant temperature may be secured and maintained automatically, but this result is achieved without the necessity for extensive pipe line installations. Wherever an alternating electromotive force is available heating units may be readily installed with the same facility as lighting equipment.

Fig. 5 shows diagrammatically a heating system arrangement such as is contemplated. The numeral 20 represents a number of radiators which are placed in convenient locations and 21 and 22 power mains which are connected to a source of alternating current, represented generically by the numeral 23. Current may be taken from the mains 21 and 22 through the electrical connections which may contain switches 24 for the usual purpose. The operation of each of the radiators 20 is identical with that hereinbefore described.

Fig. 6 is a diagrammatic representation of a further adaptation of the conception involved in my invention. The numeral 25 is indicative of a furnace structure in which is mounted a plurality of electrodes 26 and 27. The electrodes 26 are connected to a common terminal, to which a lead 28 is secured, and the electrodes 27 are connected to a common terminal, to which a lead 29 is secured. Said electrodes will be arranged in operative pairs after the manner of battery plates, and the structure 25 will be filled with an electrolyte 30 to a depth sufficient to cover said electrodes. One end of a steam line 31 is connected to the furnace 25 above the level of the electrolyte 30 and the other end of said line connects to one end of a return line 32 which leads back to said furnace. Radiators 33 may be connected across the lines 31 and 32 in the usual manner. In the operation of this modification, the application of an alternating electromotive force to the terminal of the electrodes 26 and 27 will effect a formation of steam which will pass to the radiators 33 through the line 31. The difference between this arrangement and that heretofore described resides in the fact that the regulation of steam production is effected at the steam source common to all radiators 33, rather than at the individual radiators.

If it is desired to establish a constant room temperature which is different from that for which the radiator is designed, the arrangement illustrated in Fig. 7 may be adopted. The numeral 34 represents a radiator which is constructed after the manner of the radiator 10 and which is connected to power mains 35 and 36, through which an alternating current flows. The current passing to said radiator may be caused to flow through a variable resistance 37 after a switch 38 is closed. By this arrangement, any predetermined maximum current flow through the radiator 34 may be readily established, which in turn means a corresponding, constant temperature external of said radiator. As a further aid, it is contemplated that the resistance 37 may be calibrated directly in degrees of temperature, so that any desired temperature may be readily attained.

While I have shown one set of elements and combinations thereof for effectuating my improved heating apparatus, it will be understood that the same are for the purpose of illustration only and in nowise to restrict the device to the exact forms and structures shown, for many changes may be made therein without departing from the spirit of my invention.

I claim:

Electric heating apparatus comprising a closed chamber, a receptacle communicating therewith containing a predetermined quantity of vaporizable electrolyte, and a pair of plate electrodes of triangular shape immersed in said electrolyte in diverging relation downwardly, the apexes of said electrodes being lowermost.

In testimony whereof, I affix my signature.

WALTER W. ROBINSON.